BEACH & BROWN.
Cultivator.

No. 31,367.

Patented Feb. 12, 1861.

Witnesses.
Samuel Ellund
Ritchson Williams

Inventors:
Charles Beach
Thomas Brown

UNITED STATES PATENT OFFICE.

CHARLES BEACH AND THOMAS BROWN, OF JACKSONTOWN, OHIO.

IMPROVEMENT IN CULTIVATORS.

Specification forming part of Letters Patent No. 31,367, dated February 12, 1861.

*To all whom it may concern:*

Be it known that we, CHARLES BEACH and THOMAS BROWN, of Jacksontown, in the county of Licking and State of Ohio, have invented a new and Improved Plow for the Cultivation of Indian Corn and other Plants; and we do hereby declare that the following is a full and exact description thereof, reference being had to the accompanying drawings, and to the letters of reference marked thereon.

Figure 1:
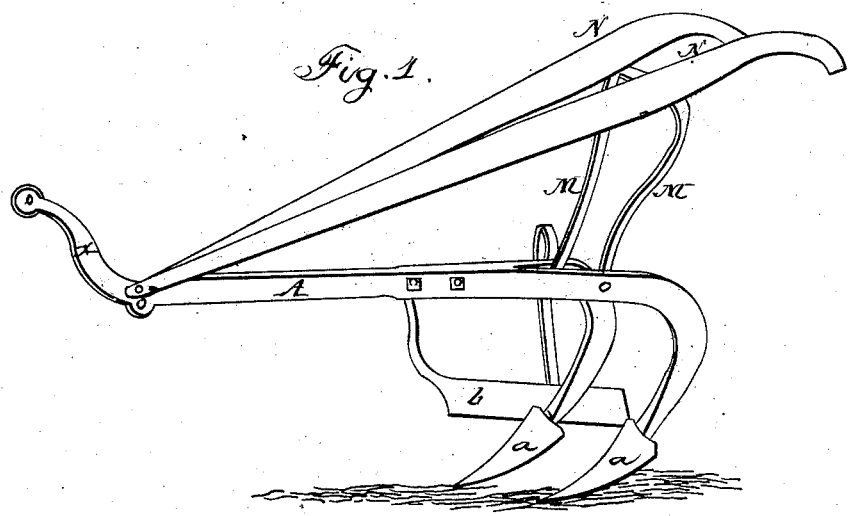
Figure 4:
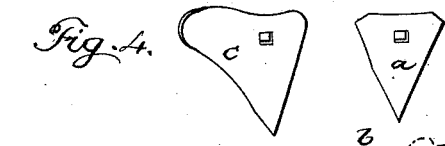
Figure 2:
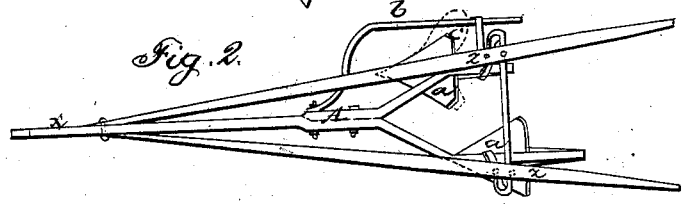
Figure 3:
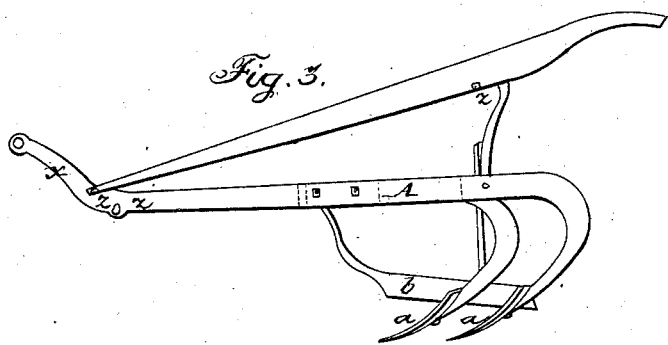

Figure 1 is a perspective; Fig. 2, a plan; Fig. 3, a side elevation; Fig. 4, shovels.

To enable others skilled in the art to make and use our invention, we will proceed to describe its construction and operation.

We construct one frame, A, of wrought-iron, in the usual form, (excepting the end of the beam, which is curved, $x$, and pierced with two or more holes for changing the draft,) with two handles, N N, and curved standards M M, with the adjustable holes $z$ for the lateral adjustment of the handles. The shovels are slightly concave on the face, as shown at $a$, Fig. 2, and may be attached to the beam by any of the ordinary methods of screws and bolts, so as to be removable at pleasure.

The shield $b$ is a wrought-iron blade, setting parallel to the beam, extending about the same distance before and behind the shovel nearest to it. It should be set about two inches from the shovel, and the bottom or edge of it should be about one inch below the top of the shovel. It is attached to the beam, as shown in the drawings, with bolts and screws, or in any other manner admitting its easy removal.

The mold-board shovel is constructed as shown in Fig. 4, $c$, the side nearest the plants, being lengthened out into a concave ear, to throw the earth up to the plants. It is to be used (when the plants require hilling) as a substitute for the shovel nearest the shield, and when used the shield is to be removed.

What we desire to secure and claim by Letters Patent is—

The arrangement of the concave shovel $c$, shield or guard $b$, beam A, with its curved neck $x$, the curved standards M M, and the handles N N, the whole being constructed as and for the purpose herein set forth.

CHARLES BEACH.
THOMAS BROWN.

Witnesses:
JOHN T. ARMSTRONG,
SAMUEL GILLILAND.